United States Patent
Nguyen et al.

(10) Patent No.: US 10,279,511 B2
(45) Date of Patent: May 7, 2019

(54) METHOD FOR BAKING A CONTINUOUS MAT OF MINERAL OR PLANT FIBERS

(71) Applicant: SAINT-GOBAIN ISOVER, Courbevoie (FR)

(72) Inventors: Christine Nguyen, Paris (FR); Francois Vianey, Paris (FR); Arnaud Letourmy, Margny les Compiegne (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 481 days.

(21) Appl. No.: 14/419,077

(22) PCT Filed: Jul. 25, 2013

(86) PCT No.: PCT/FR2013/051795
§ 371 (c)(1),
(2) Date: Feb. 2, 2015

(87) PCT Pub. No.: WO2014/020265
PCT Pub. Date: Feb. 6, 2014

(65) Prior Publication Data
US 2015/0190948 A1 Jul. 9, 2015

(30) Foreign Application Priority Data
Jul. 31, 2012 (FR) ...................... 12 57439

(51) Int. Cl.
*B29C 35/08* (2006.01)
*B29C 35/06* (2006.01)
(Continued)

(52) U.S. Cl.
CPC ............ *B29C 35/08* (2013.01); *B29C 35/045* (2013.01); *B29C 35/06* (2013.01);
(Continued)

(58) Field of Classification Search
CPC ..... B29C 35/08; B29C 35/10; B29C 35/0805; B29C 2035/0861
(Continued)

(56) References Cited

U.S. PATENT DOCUMENTS

| 3,096,161 A | 7/1963 | Morrison et al. |
| 4,188,355 A | 2/1980 | Graham et al. |

(Continued)

FOREIGN PATENT DOCUMENTS

| DE | 15 60 817 | 8/1971 |
| EP | 0 000 111 | 12/1978 |

(Continued)

OTHER PUBLICATIONS

Office Action dated Mar. 21, 2017 in Japanese Patent Application No. 2015-524827 (English translation only).
(Continued)

*Primary Examiner* — Christina A Johnson
*Assistant Examiner* — Xue H Liu
(74) *Attorney, Agent, or Firm* — Oblon, McClelland, Maier & Neustadt, L.L.P.

(57) ABSTRACT

A method for baking a continuous mat of mineral or plant fibers successively includes application of an aqueous solution, containing a binder diluted in the solution, onto mineral or plant fibers, shaping of the fibers to form a continuous mat on a conveyor in motion, and heating the mat in movement through an oven by a hot air flow at a temperature higher than the curing temperature of the binder. Furthermore, at least partial drying of the mat is carried out before entry into the oven. The at least partial drying includes irradiation of the mat in movement with radiofrequency electromagnetic waves whose frequency lies between 3 MHz and 300 GHz.

10 Claims, 4 Drawing Sheets

(51) Int. Cl.
| | |
|---|---|
| B29C 35/10 | (2006.01) |
| D04H 1/04 | (2012.01) |
| D04H 1/4209 | (2012.01) |
| D04H 1/4218 | (2012.01) |
| D04H 1/425 | (2012.01) |
| D04H 1/4266 | (2012.01) |
| D04H 1/554 | (2012.01) |
| D04H 1/587 | (2012.01) |
| D04H 1/64 | (2012.01) |
| F26B 3/347 | (2006.01) |
| F26B 13/10 | (2006.01) |
| F26B 17/02 | (2006.01) |
| B29C 35/04 | (2006.01) |
| B29C 67/24 | (2006.01) |
| B29C 37/00 | (2006.01) |
| B29L 7/00 | (2006.01) |

(52) U.S. Cl.
CPC .......... *B29C 35/0805* (2013.01); *B29C 35/10* (2013.01); *B29C 67/249* (2013.01); *D04H 1/04* (2013.01); *D04H 1/425* (2013.01); *D04H 1/4209* (2013.01); *D04H 1/4218* (2013.01); *D04H 1/4266* (2013.01); *D04H 1/554* (2013.01); *D04H 1/587* (2013.01); *D04H 1/64* (2013.01); *F26B 3/347* (2013.01); *F26B 13/101* (2013.01); *F26B 17/026* (2013.01); *B29C 37/0064* (2013.01); *B29C 2035/0855* (2013.01); *B29C 2035/0861* (2013.01); *B29L 2007/00* (2013.01)

(58) Field of Classification Search
USPC .......................................... 264/430, 475, 491
See application file for complete search history.

(56) References Cited

U.S. PATENT DOCUMENTS

| | | | |
|---|---|---|---|
| 4,298,418 A | | 11/1981 | Takagi |
| 4,613,627 A | * | 9/1986 | Sherman ............... C04B 26/285 106/122 |
| 4,622,238 A | | 11/1986 | Franz et al. |
| 4,678,822 A | | 7/1987 | Lewellin |
| 4,697,355 A | * | 10/1987 | Mino ...................... F26B 3/283 34/274 |
| 4,734,996 A | | 4/1988 | Kim et al. |
| 4,879,444 A | | 11/1989 | Bichot et al. |
| 4,906,309 A | | 3/1990 | Bichot et al. |
| 7,435,444 B2 | | 10/2008 | Freeman et al. |
| 7,795,354 B2 | | 9/2010 | Srinivasan et al. |
| 2002/0025750 A1 | * | 2/2002 | Dinwoodie ............... B32B 5/02 442/138 |
| 2007/0261446 A1 | * | 11/2007 | Baker ..................... C03B 37/04 65/453 |
| 2008/0102216 A1 | | 5/2008 | Charbonneau |
| 2008/0116617 A1 | * | 5/2008 | Toncelli ................. B28B 11/24 264/444 |
| 2012/0145035 A1 | | 6/2012 | Shallenberger et al. |

FOREIGN PATENT DOCUMENTS

| | | |
|---|---|---|
| EP | 1 382 642 A1 | 1/2004 |
| FR | 2 548 586 | 1/1985 |
| JP | 48-64850 U | 8/1973 |
| JP | 53-49169 A | 5/1978 |
| JP | 55-93862 A | 7/1980 |
| JP | 11-500795 A | 1/1999 |
| JP | 2010-532739 A | 10/2010 |
| WO | WO 84/00041 | 1/1984 |
| WO | 88/04760 | 6/1988 |
| WO | 97/32118 | 9/1997 |
| WO | 98/04404 | 2/1998 |
| WO | 2011/030052 | 3/2011 |

OTHER PUBLICATIONS

Pilato, *Phenolic Resins: A Century of Progress*, Chapter 10, Stefan Kowatsch, "Mineral Wool Insulation Binders," ISBN 978-3-642-04713-8, (2010).

Richardson, *Thermal Technologies in Food Processing*, Part III, Chapter 9, A.T. Rowley, "Radio Frequency Heating," EA Technology Ltd., (2001).

Bartholme et al., "Microwave Drying of Wet Processed Wood Fibre Insulating Boards," Eur. J. Wood Prod. 67, pp. 357-360, (2009).

Deng et al., "An Experimental Study of Microwave Pre-Heating of an MDF Fiber Mat: Moisture and Temperature Distribution and the Impact on Hot-Pressing," Forest Products Journal, vol. 56, No. 6, pp. 76-81, (Jun. 2006).

European Commission, *Integrated Pollution Prevention and Control (IPPC)*, Reference Document on Best Available Techniques in the Glass Manufacturing Industry. pp. 57-60 and 200-201, (Dec. 2001).

International Search Report dated Sep. 26, 2013 in PCT/FR13/051795 filed Jul. 25, 2013.

* cited by examiner

METHOD FOR BAKING A CONTINUOUS MAT OF MINERAL OR PLANT FIBERS

The present invention relates to the field of manufacturing methods, more particularly for baking a continuous mat of mineral or plant fibers, in particular mineral wool, of the glass or rock fiber type. These mats are intended to be cut up in order subsequently to form, for example, panels or rolls of thermal and/or acoustic insulation.

The manufacture of such mats of insulating fibers primarily comprises fibering and deposition of fibers on a perforated conveyor or mobile transporter. The mass of newly formed fibers is pressed onto the conveyor with the aid of suction compartments arranged under the transporter on which the fibers are arranged. During the fibering, a binder is sprayed in the state of a solution or suspension in a volatile liquid such as water onto the stretched fibers, this binder having adhesion properties and usually comprising a heat-curable material, such as a thermally curable resin, most often until recently a formophenolic resin.

The primary layer of relatively loose fibers on the collector conveyor is then transferred to a heating device, commonly referred to in the field as a crosslinking oven. The fiber mat passes through the entire length of the oven by virtue of additional perforated conveyors. These are often two endless conveyors facing one another and spaced apart by a distance adjusted in order to determine the thickness of the mat which is formed. Each branch of the conveyors is furthermore constructed from pallets consisting of mutually articulated grilles which are perforated in order to be permeable to air and the other gases resulting from heating the mat. Such a mat thus has a greater or lesser density depending on the degree of compression exerted by the two transporters in the oven.

During its passage through the oven, the mat is simultaneously dried and subjected to a specific heat treatment, which causes polymerization (curing) of the thermally curable resin of the binder present on the surface of the fibers. This curing also leads to crosslinking of the fibers with one another in a three-dimensional structure (that is to say a bond via the thermally cured binder to the points of contact between the fibers) and thus to stabilization and elasticity of the mat with the desired thickness, whether under the effect of flexion or compression.

The operating mode used in order to bring about curing of the binder consists in passing heated air through the mat, so that the binder present throughout the thickness of the mat is progressively heated to a temperature higher than its curing temperature. To this end, the crosslinking oven is composed of a housing constituting a closed chamber in which a series of compartments, supplied by burners with hot air circulated by fans, are arranged. Each compartment thus defines an independent heating zone, in which specific heating conditions are regulated. The compartments are separated by walls having openings for the mat and the upper and lower conveyors. The use of a plurality of compartments thus allows graded elevation of the temperature of the mat throughout its passage through the oven, and avoids the occurrence of hot spots due to locally excessive heating, or alternatively the presence in the mat of regions in which the binder has not been fully polymerized. An oven used in the mineral wool manufacturing process thus very often comprises a multiplicity of compartments (for example between 3 and 10), as well as known means for establishing variable thermal conditions within each compartment.

Currently, the use of new alternative binders, as a replacement for formophenolic resins, makes it very difficult to control the conditions of the fiber mat baking process in a conventional oven as described above. Such binders, which do not generally contain formaldehyde, and are sometimes referred to as "green binders", particularly when they are at least partially obtained from a base of renewable primary material, in particular plant material, in particular of the type based on hydrogenated or non-hydrogenated sugars, for example, as described in Applications WO 2009/080938 and WO 2010/029266, most often require very good regulation of the baking temperatures in order to reach the thermally cured state, the range of baking temperatures being narrower. More particularly, the binder must be subjected to a temperature lying between a minimum in order to achieve its curing and a maximum above which it degrades rapidly, which ultimately leads to degraded mechanical properties of the final product, even after its installation. The difference between the minimum and maximum may be of the order of only 20° C., or less, depending on the type of green binder. Control of the temperature throughout the thickness and width of the fiber mat therefore requires new techniques, and in particular changes in the actual design of the ovens.

It is an object of the invention to provide a manufacturing method making it possible to obtain good crosslinking of the binder in the mat, including for binders requiring accurate control of the temperature during the baking of the mat.

To this end, the invention relates to a method for baking a continuous mat of mineral or plant fibers, in particular of the glass or rock type, successively comprising:
  application of a binder diluted in an aqueous solution, i.e. an aqueous solution containing a binder diluted in the solution, onto mineral or plant fibers,
  shaping of the fibers to form a continuous mat on a conveyor in motion,
  heating of the mat in movement through an oven by a hot air flow at a temperature higher than the curing temperature of the binder,
wherein the method furthermore comprises at least partial drying of the mat before entry into the oven, said at least partial drying including irradiation of the mat in movement with radiofrequency electromagnetic waves whose frequency lies between 3 MHz and 300 GHz.

The term "application" generally covers the application by spraying or atomization in fractions of binder solution of larger or smaller size, such as droplets, or the application of more or less continuous flows of binder solution in a curtain, or passage through a bath, so that the binder solution is distributed over all or some of the fibers subjected to the application.

Carrying out heating of the mat by irradiation before it enters the oven leads to a more homogeneous degree of crosslinking.

It seems that nonuniformity of the initial distribution of solvent of the binder tended to create nonuniformity of temperature at the time of baking.

The irradiation of the mat with radiofrequency waves between 3 MHz and 300 GHz, preferably microwaves (300 MHz to 300 GHz) or high-frequency waves (3 MHz to 30 MHz), makes it possible to concentrate the drying power on the largest masses of water. Furthermore, the waves pass through the mat until they encounter water.

The presence of water in the mat is thus reduced and, above all, rendered more uniform.

One advantage of irradiation before entry into the baking oven is that it is possible to control the power so that the residual presence of water upon entry into the baking oven is optimal.

Controlling the irradiation power makes it possible, for example, to avoid total evaporation and thus, for example, to preserve wettability of the binder in the oven (i.e. the capacity of the binder to spread).

According to particular embodiments, the method includes one or more of the following steps, taken separately or in any technically possible combination:
- the mat is irradiated with a sufficient power so that the presence of water in the mat after at least partial drying by irradiation is less than a predetermined value;
- the irradiation power is selected in such a way that the temperature of the mat during the drying remains less than the curing temperature of the binder;
- the irradiation power is selected in such a way that the left/right difference in percentage of water by mass in the mat is reduced to less than 30% after irradiation;
- the irradiation is carried out over the entire width of the mat in movement;
- air at a temperature less than the curing temperature of the binder is blown onto the mat in the irradiation zone in order to remove the moisture;
- the temperature of the hot air blown into at least one compartment of the oven is at least 100° C. higher than the curing temperature of the binder;
- the air is blown into the oven through the mat;
- the density of the mat lies between 5 and 250 kg/m$^3$;
- the step of applying said aqueous solution onto the mineral or plant fibers is carried out before the fibers are deposited on said conveyor;
- the application of the aqueous solution is application by spraying or atomization in fractions of binder solution of larger or smaller size, such as droplets.

The invention also relates to a method for manufacturing a continuous mat of mineral or plant fibers comprising a step of fibering with fibering equipment comprising, in particular, a centrifuge or a set of centrifuges, or a rotor or a set of rotors, followed by a baking method as described above.

The invention furthermore relates to a manufacturing line for a continuous mat of mineral or plant fibers, in particular of the glass or rock type, comprising:
- fibering means for generating mineral or plant fibers,
- means for applying a binder onto the mineral or plant fibers,
- means for shaping the fibers into a continuous mat on a conveyor in motion,
- a baking oven comprising means for heating the mat in movement through the oven by hot air flow at a temperature higher than the curing temperature of the binder, wherein the manufacturing line furthermore comprises, upstream of the baking oven, an irradiation device capable of irradiating the mat in movement with radiofrequency electromagnetic waves whose frequency lies between 3 MHz and 300 GHz.

Advantageously, the irradiation device comprises means for blowing dry air into the irradiation zone in order to remove the moisture.

Figure 1:
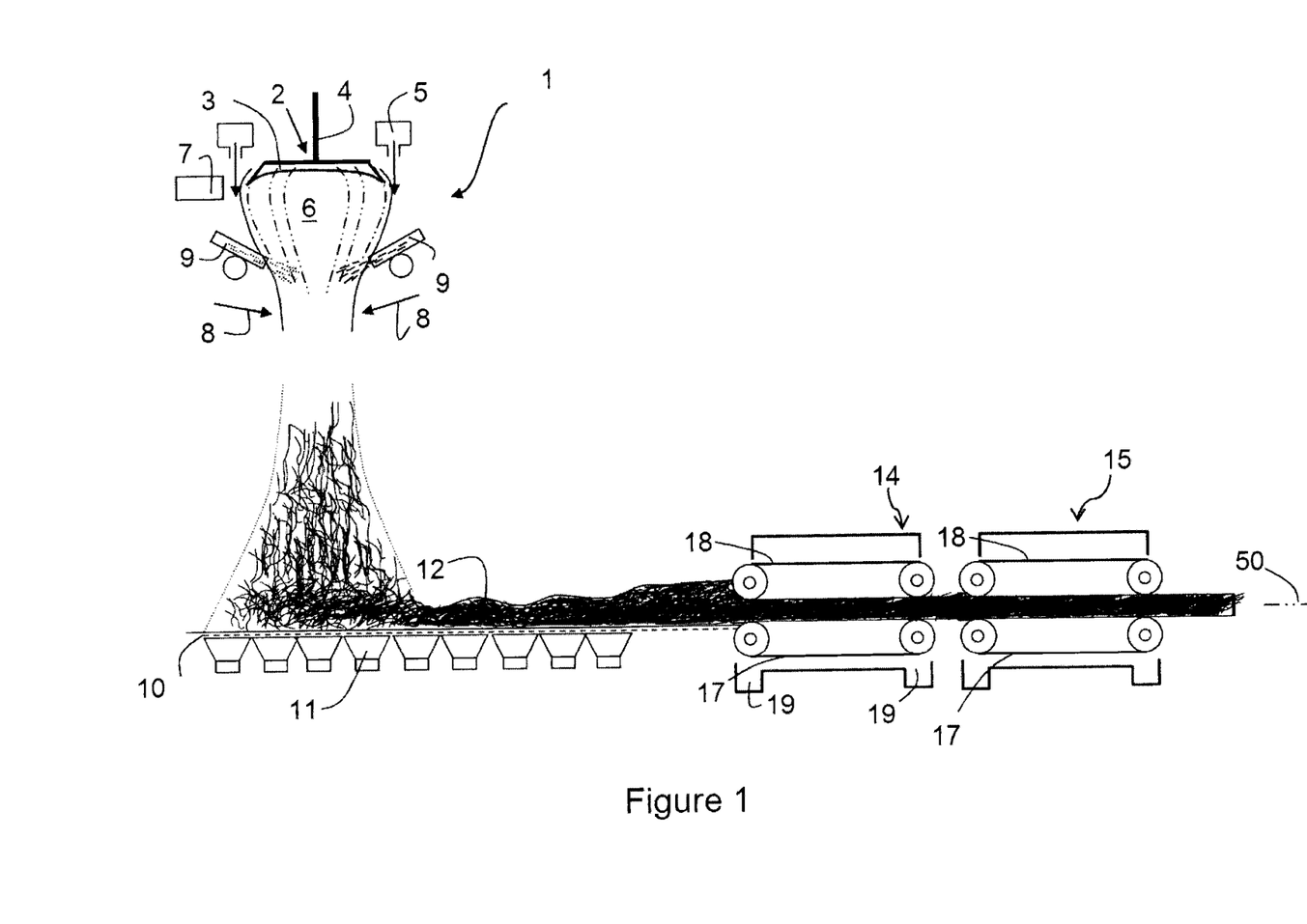
FIG. 1 describes a current installation for fibering a glass wool product.

The invention will be better understood on reading the following description, given solely by way of example and made with reference to the appended drawings, in which:

FIG. 1 represents the first steps of a production line for insulating products based on glass wool, by way of purely illustrative example, it being understood that the line is of any type suitable for the production of products based on mineral and possibly plant fibers.

The line comprises a fibering unit 1 known per se for example corresponding to the method of fibering by internal centrifugation, exemplary embodiments of which are described in Applications EP 0 406 107 and EP 0 461 995. The fibering unit comprises a hood (not represented in FIG. 1), on top of which there is at least one centrifuge 2. Each centrifuge comprises a receptacle (not represented in FIG. 1) for recovering a thread of previously melted fibering glass and a dish-shaped piece 3 whose peripheral wall is provided with a large number of orifices. During operation, the molten glass, formed into a thread 4 from a melting furnace (not represented) and firstly recovered in the centrifuge receptacle, emerges through the orifices of the dish 3 in the form of a multitude of filaments set in rotation. The centrifuge 2 is furthermore surrounded by an annular burner 5 which creates, at the periphery of the wall of the centrifuge, a gas flow at high speed and at a sufficiently high temperature to draw the glass filaments into fibers in the form of a veil 6. The fibering according to this method is integral, and produces 100% usable fibers. The method furthermore ensures long and flexible fibers.

Heating means 7, for example of the inductor type, are used to keep the glass and the centrifuge at the correct temperature. The veil 6 is enclosed by a gas flow of air introduced under pressure, schematized by the arrows 8. The torus 6 is surrounded by a device for spraying a bonding agent containing a thermally curable binder in aqueous solution, only two elements 9 of which are represented in FIG. 1.

It is, for example, a phenolic binder or an alternative binder which may not contain formaldehyde, binders which are sometimes referred to as "green binders", in particular when they are at least partially obtained from a base of renewable primary material, in particular plant material, particularly of the type based on hydrogenated or non-hydrogenated sugars, for example, as described in Applications WO 2009/080938 and WO 2010/029266.

The bottom of the fibering hood consists of a device for receiving fibers, comprising a conveyor incorporating an endless belt 10 which is permeable to gases and water, under which compartments 11 are arranged for extracting gases, such as air, fumes and excess aqueous compositions coming from the fibering process described above. A mat 12 of glass wool fibers mixed intimately with the bonding composition is thus formed on the belt 10 of the conveyor.

The mat 12 is transported to an irradiation device 14 for irradiating the mat 12, then into an oven 15 for crosslinking baking it.

Figure 2:
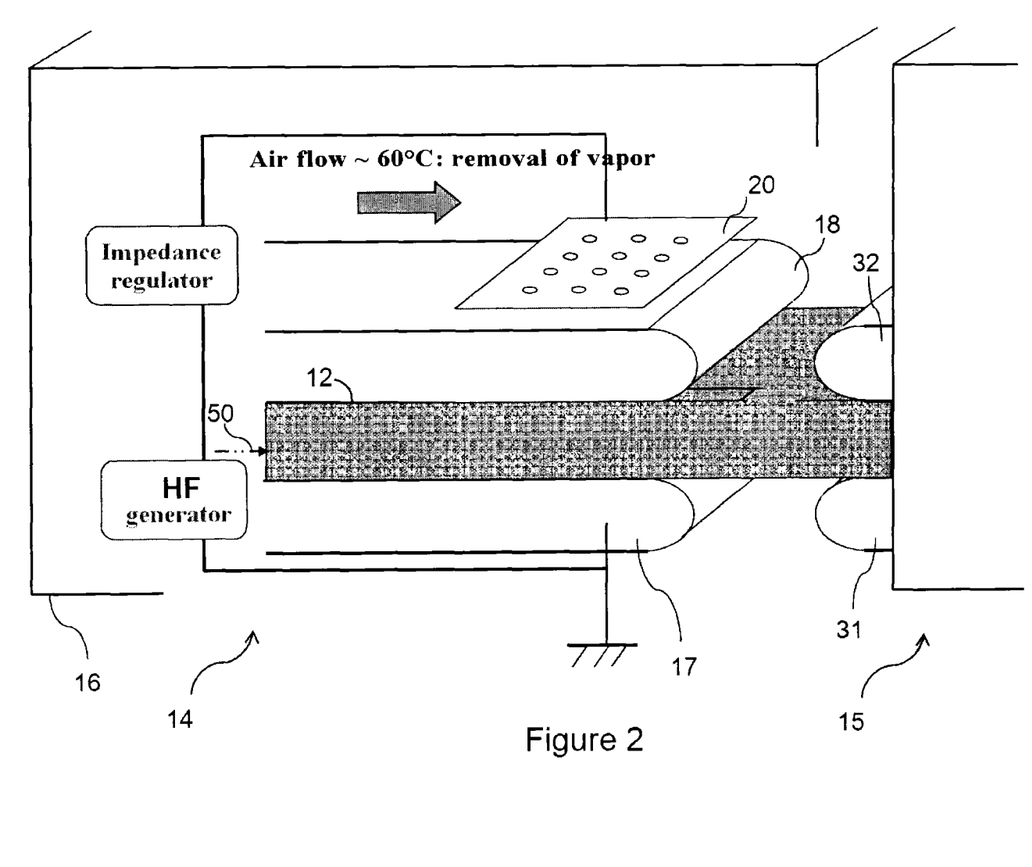
FIG. 2 is a schematic frontal representation of a device for irradiating the mat produced in FIG. 1.

The irradiation device 14 is illustrated in more detail in FIG. 2.

As represented schematically in FIG. 2 as a nonlimiting example and purely by way of illustration, this device 14 is surrounded by a closed housing 16. Two conveyors, lower 17 and upper 18, for transporting and calibrating the mat 12 pass through the housing 16. These conveyors 17, 18 are for example set in rotation by motors 19 placed on the floor, and consist for example, in a manner known for crosslinking ovens, of a succession of palettes formed by mutually articulated grilles which are perforated in order to be permeable to gases.

The device 14 is provided with means for irradiation with radiofrequency electromagnetic waves, comprising for example the lower conveyor 17 and an opposite metal plate 20. To this end, the lower conveyor 17 is made of metal and grounded. The plate 20 is provided with cavities and forms an electrode facing the conveyor 17 and, for example, above the upper conveyor 18, which conveyor 18 is not made of metal.

As a variant, however, the irradiation device 14 is of any type suitable for irradiating the mat with radiofrequency electromagnetic waves. As a variant, the electrodes are provided for example on the sides of the mat.

The irradiation is carried out over the entire width of the mat and absorbed at least partly by the mat 12.

The irradiation power is, for example, sufficient to evaporate between 1% and 20% of water by mass during the passage of the mat through the irradiation device.

The average water content of the mat before the irradiation device varies, for example, from 0.5% to 20% by mass. The measurement is carried out in the following way:

One or more samples of about 50 to 80 g is/are taken before the irradiation device at more than 20 cm from the edges of the mat and, for example, at different thickness levels of the mat.

Each sample is initially weighed for a first time (value "mass1"). Each sample is then arranged in a small fan oven at 105° C. for 1 h in order to evaporate the water present, then placed rapidly in a desiccator (vacuum chamber) for 30 minutes in order to lower its temperature without taking up water. After cooling to room temperature in the desiccator, the mass of each sample is measured again (value "mass2"). The percentage of water by mass in the sample is then:

$$\text{Percentage of water by mass} = \frac{mass1 - mass2}{mass1} * 100$$

An averaged value (arithmetic mean) of the percentage of water by mass is then calculated in the case of a plurality of samples.

The term evaporating Y % of water by mass means that the mass of water changes from X %, which represents the % of water by mass of the mat before irradiation, to X %-Y % after irradiation of the mat in the device.

The irradiation power is, for example, also selected in such a way that the left/right difference in percentage of water by mass in the mat is reduced to less than 30% after irradiation.

This difference means the delta of percentage of water by mass in the mat between the left and the right (i.e. in the direction of the width).

In order to measure this difference, a plurality of samples (for example three) of about 50 to 80 g are taken on the left at 20 cm from the left edge of the mat and three other samples are taken on the right at 20 cm from the right edge of the mat (NB: the mats have a width of more than 60 cm). The percentage of water by mass of each sample is measured according to the method described above.

Six values of percentage of water by mass are obtained: $\%_{left\ 1}$, $\%_{left\ 2}$, $\%_{left\ 3}$, $\%_{right\ 1}$, $\%_{right\ 2}$, $\%_{right\ 3}$ The arithmetic means of the three values on the left and of the three values on the right are calculated, then their difference in absolute value is calculated in order to obtain the desired value of left/right difference:

$$\text{Difference} = \left| \frac{\%\ left\ 1 + \%\ left\ 2 + \%\ left\ 3}{3} - \frac{\%\ right\ 1 + \%\ right\ 2 + \%\ right\ 3}{3} \right|$$

A first difference $\text{Difference}_{before}$ is measured before irradiation with the samples taken on the left and the right, and a second difference $\text{Difference}_{after}$ is measured after irradiation in the same way.

The percentage of difference reduction is calculated by:

$$\frac{\text{Difference}_{before} - \text{Difference}_{after}}{\text{Difference}_{before}} * 100$$

The irradiation power is furthermore selected in such a way that the temperature in the mat during the drying remains less than the curing temperature of the binder, in contrast to the heating carried out downstream in the cross-linking oven, as explained in more detail below.

The possible frequency range used for the irradiation extends from 3 MHz to 300 GHz (limits included), more particularly from 3 to 30 MHz (limits included) for high-frequency waves and from 300 MHz to 300 GHz (limits included) for microwaves. The frequency of the waves is, for example, 915 or 2450 MHz for microwaves and 13.56 or 27.12 MHz for high-frequency waves.

It has in fact been found, as shown by the experiments below, that high-frequency waves or microwaves could be used with good results. Furthermore, high-frequency waves have the advantage that they make it possible to produce a resonance cavity, adapted to the width of the mat, more easily than microwaves. High-frequency waves also have the advantage of presenting less design difficulties for ensuring safety of the device.

The irradiation is associated with blowing of dry air, preferably dry and hot air, into the mat irradiation zone in order to remove the moisture released by the irradiation (illustrated by the arrow in FIG. 2). The temperature of the blown air is, however, preferably very much lower than the curing temperature of the binder. It is, for example, 60° C.

It is, for example, an air flow passing above the mat 12 and along it, or alternatively a flow crossing the mat along its thickness.

Figure 3:
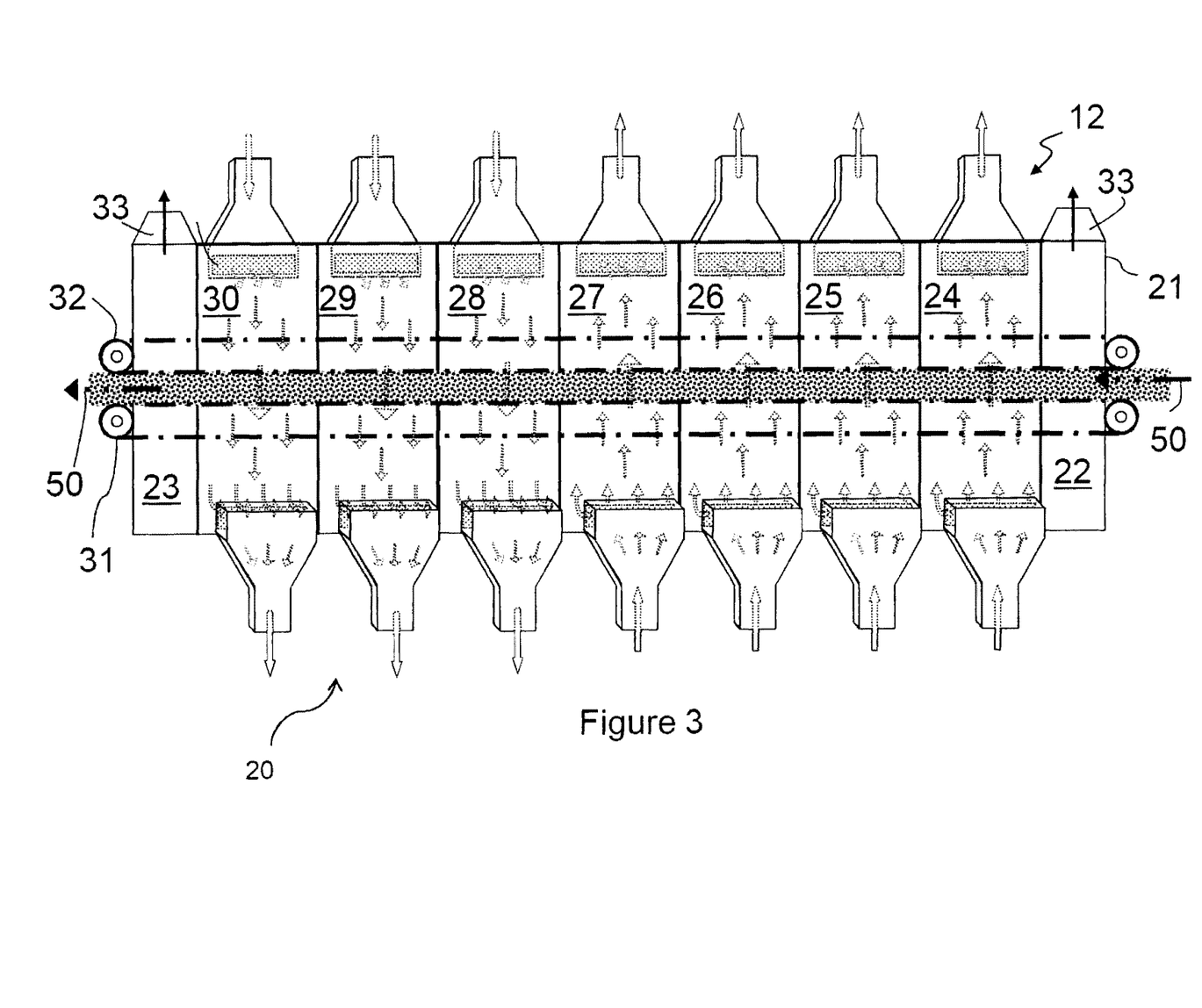
FIG. 3 schematically illustrates from behind a baking oven for baking the mat, arranged immediately downstream of the device of FIG. 2.

The mat 12 subsequently enters the oven 15 for cross-linking the thermally curable binder.

As represented in FIG. 3, as a nonlimiting example and purely by way of illustration (here, the oven is seen from the other side), this oven 15 is surrounded by a closed housing 21 delimiting entry 22 and exit 23 ports and a series of compartments 24-30 separated by one another by walls and individually supplied by burners with hot air circulated by fans (not represented). Two conveyors 31, 32 for transporting and calibrating the mat 12 pass through the housing. These conveyors 31, 32 are for example set in rotation by motors placed on the floor, and consist in a well known manner of a succession of palettes formed by mutually articulated grilles which are perforated in order to be permeable to gases.

While ensuring passage of the hot gases so as to promote rapid setting of the binder, the conveyors 31, 32 compress the mat 12 in order to give it the desired thickness. By way of example, for a finished product, this typically lies between 10 and 450 mm, the density of the glass wool layer lying for example between 5 and 150 kg/m³. Distinction is thus made, for example, between so-called low-density products, for which the density varies between 5 and 20 kg/m³, and so-called high-density products, in which the density varies between 20 and 250 kg/m³.

The entry 22 and exit 23 ports open onto fume extraction hoods 33 (the extraction direction of which is represented in FIG. 2 by way of solid black arrows), these hoods being connected to a circuit (not represented in the figures) provided for processing said fumes.

In the figures, the circulation of the air in the oven is represented by dotted arrows. The direction of movement of the mat is indicated by the arrows 50.

In the first compartments, for example compartments 24-27, the hot air is introduced through the bottom of the oven and extracted through the top, after it has crossed the mat. The use of a plurality of compartments permits a progressive temperature rise of the fiber mat to a temperature higher than the curing temperature of the binder present on the fibers of the mat.

In the subsequent compartments, for example compartments 28-30, the hot air is this time introduced through the top of the oven and extracted from the bottom.

The additional fumes generated in the compartments are finally extracted into the exit port 23, via the hood 33.

In general, the temperature of the hot air blown into the oven in the compartments 24-30 is at least 100° C. higher than the curing temperature of the binder, for example hot air between 180° C. and 300° C.

EXPERIMENTAL RESULTS

Samples of moist glass wool mat taken just after forming (i.e. before baking) were subjected to sequences of irradiation with frequency 27.12 MHz, 915 MHz and 2450 MHz in industrial prototypes.

For each of the sequences 1 to 5, a sample of 300 mm×300 mm was taken and subjected to several exposures and successive measurements.

Each sample was irradiated to complete dryness (i.e. stabilization of the mass) with an intermediate mass measurement between each irradiation.

When it was possible, the variation in the temperature (i.e. temperature at the start of the irradiation and at the end indicated between brackets) within the sample was measured at one point by an optical fiber.

For each sequence, the remaining mass of water is indicated, that is to say the mass of the sample minus its final mass.

1$^{st}$ Sequence: Exposure of a Sample to an Effective (Non-reflected Power) of 2 kW at 2450 MHz

TABLE 1

| Total exposure duration (s) | Effective power (kW) | Remaining mass of water (g) | Temperature range (° C.) |
|---|---|---|---|
| 0 | — | 17 | |
| 20 | 2 | 8 | [25, 60] |
| 40 | 2 | 2 | [48, 72] |
| 100 | 2 | 0 | [38, 70] |
| 160 | 2 | 0 | [45, 60] |

2$^{nd}$ Sequence: Exposure of a Sample to an Effective Power of 4 kW at 2450 MHz

TABLE 2

| Total exposure duration (s) | Effective power (kW) | Remaining mass of water (g) | Temperature range (° C.) |
|---|---|---|---|
| 0 | — | 30 | — |
| 20 | 4 | 10 | [23, 95] |
| 140 | 4 | 0 | [70, 102] |

3$^{rd}$ Sequence: Exposure of a Sample to an Effective Power of the Order of 2 kW at 27.12 MHz

TABLE 3

| Total exposure duration (s) | Effective power (kW) | Remaining mass of water (g) |
|---|---|---|
| 0 | — | 26 |
| 40 | 2.23 | 8 |
| 160 | 1.74 | 2 |
| 400 | 2.45 | 0 |

4$^{th}$ Sequence: Exposure of a Sample to an Effective Power of 2.5 kW at 27.12 MHz

TABLE 4

| Total exposure duration (s) | Effective power (kW) | Remaining mass of water (g) |
|---|---|---|
| 0 | — | 44 |
| 20 | 2.50 | 30 |
| 40 | 2.50 | 18 |
| 60 | 2.50 | 9 |
| 180 | 2.50 | 0 |

5$^{th}$ Sequence: Exposure of a Sample to an Emitted Power (Effective Power not Measured) of the Order of 2.5 kW at 27.12 MHz

TABLE 5

| Total exposure duration (s) | Effective power (kW) | Remaining mass of water (g) |
|---|---|---|
| 0 | — | 23 |
| 14 | 3 | 15 |
| 74 | 1 | 6 |
| 134 | 1 | 0 |

6$^{th}$ Sequence: Homogenization Test with Exposure to an Effective Power of 2.48 kW at 27.12 MHz For this test, a sample of 300 mm×300 mm was cut into two halves artificially sprinkled with water differently, in order to create two separate concentrations. The samples were then introduced into the high-frequency system for 50 s, leading to the following mass losses.

TABLE 6

| Total exposure duration (s) | Effective power (kW) | Mass of the 1$^{st}$ half (g) | Mass of the 2$^{nd}$ half (g) |
|---|---|---|---|
| 0 | — | 97 | 119 |
| 50 | 2.48 | 83 | 95 |

7$^{th}$ Sequence: Homogenization Test with Exposure to 2450 MHz

For this test, two samples of 210 mm×105 mm were cut from the mat with only their level of moisture differing, sample 2 being moister than sample 1. They were placed together in a microwave irradiation device and subjected to the same irradiation (i.e. 900 W of emitted power) with successive irradiation times.

The two samples were then weighed after each irradiation time.

The results are given in the table below:

The water contents are the percentages of water by mass expressed in a base having base 100 as reference.

Base 100 corresponds to the initial percentage of water by mass in sample 1 ($Content_{initial\ sample\ 1}$).

A value of X in base 100 therefore corresponds to a water content of X % of $Content_{initial\ sample\ 1}$.

TABLE 7

| Exposure time (s) | Water content Sample 1 (base 100) | Water content Sample 2 base 100) |
|---|---|---|
| 0 | 100 | 179 |
| 15 | 83 | 151 |
| 30 | 81 | 135 |
| 45 | 78 | 129 |
| 60 | 77 | 123 |
| 75 | 77 | 122 |
| 90 | 76 | 121 |
| 150 | 70 | 113 |

Analysis of Drying Efficiency

Figure 4:
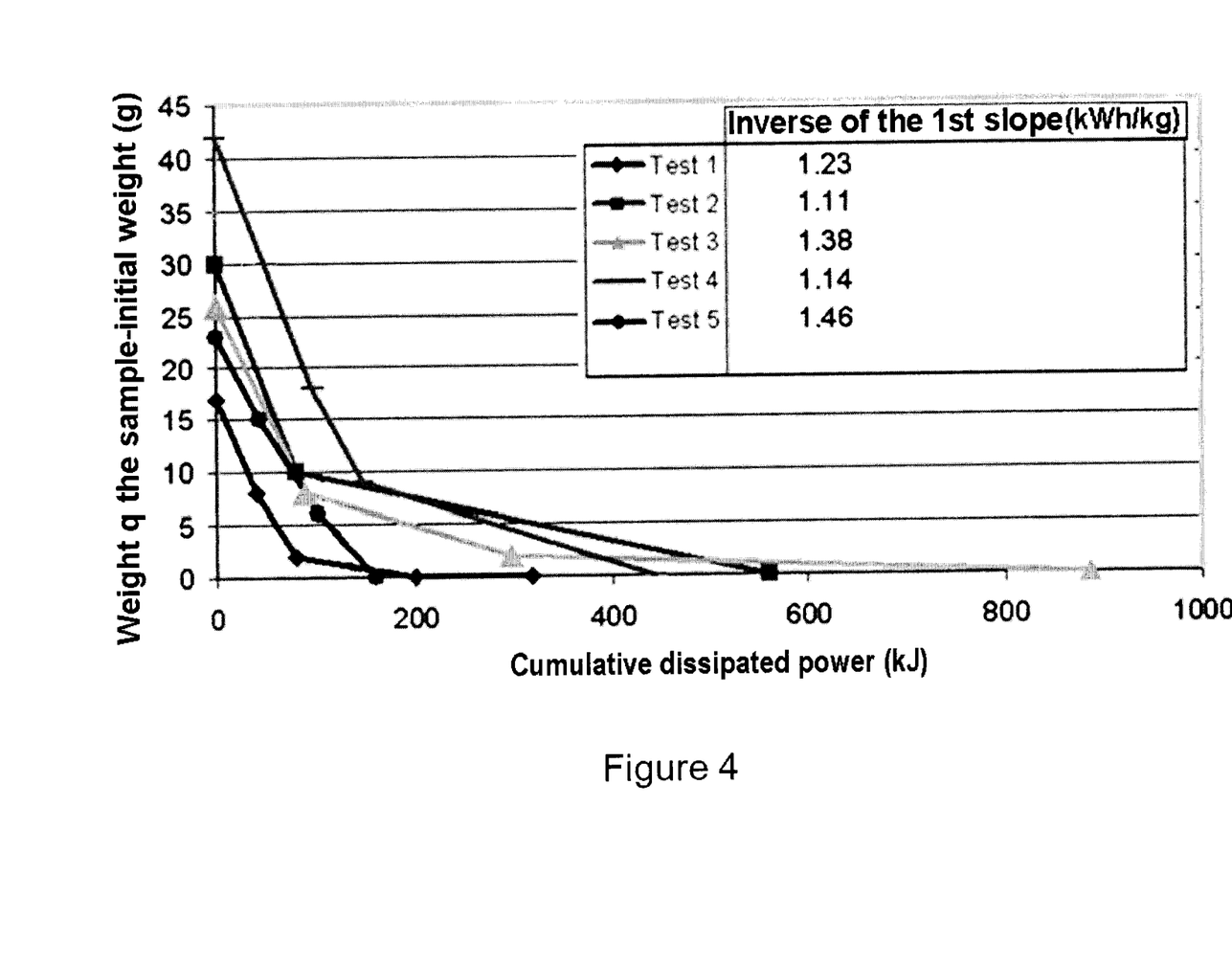
FIG. 4 is a diagram illustrating experiments carried out with various irradiation devices emitting at different frequencies, the diagram illustrating the mass loss of the samples as a function of the energy dissipated (i.e. effective or "nonreflected" energy).

The tests carried out demonstrate the possibility of drying the glass wool samples with the different frequencies used, and make it possible to evaluate a minimum efficiency (in kWh of effective power per kg of water evaporated) which may be expected to be obtained with this type of oven. These values are indicated in FIG. 4, in which the mass loss of the samples is represented as a function of the effective energy dissipated.

Taking into account a part of heating material, it seems reasonable to estimate at around 0.9 kWh/kg of water the energy necessary for the evaporation. Our tests therefore demonstrate a minimum drying efficiency of from 60 to 90% for the various frequencies.

Analysis of Baking Efficiency

Throughout the tests conducted, it was not possible to measure a material temperature higher than 105° C. Likewise, the samples did not show traces of polymerization (which takes place well above 100° C.). It therefore seems that the baking of the samples is less evident than their drying.

Furthermore, it should be noted that the level of binder was also measured on certain mats baked without irradiation, and on corresponding irradiated and baked mats, which made it possible to verify that the level of binder remains constant and that the irradiation does not affect the binder.

Analysis of Homogenization

The homogenization test sequence 6 shows a mass reduction of 20% (respectively against 14%) for the moister sample (respectively for the less moist sample). Homogenization is observed.

The homogenization test sequence 7 shows that the evaporation is greater and more rapid when the sample is moister, i.e. sample 2.

It is also shown that the moistness the difference in moisture between the two samples was reduced by 46%.
Difference time 0 s: 79
Difference time 150 s: 43

$$\text{I.e.} \quad \frac{79-43}{79} * 100 = 46\%$$

The invention claimed is:

1. A method for baking a continuous mat of mineral or plant fibers, or of glass or rock type, successively comprising:
    application of an aqueous solution, containing a binder diluted in the solution, onto mineral or plant fibers;
    shaping of the fibers to form a continuous mat on a conveyor in motion;
    heating the mat in movement through an oven by a hot air flow at a temperature higher than a curing temperature of the binder;
    at least partial drying of the mat before entry into any oven for heating, the at least partial drying including irradiation of the mat in movement with radiofrequency electromagnetic waves whose frequency lies between 3 MHz and 300 GHz,
    wherein during the at least partial drying of the mat before entry into any oven for heating, air at a temperature less than curing temperature of the binder is blown onto the mat in an irradiation zone to remove moisture,
    wherein the oven includes a plurality of compartments, and
    wherein one or more of the compartments introduces hot air from a bottom of the oven in a direction transverse to a direction of movement of the mat and the hot air is extracted though a top of the oven, and one or more of the compartments introduce hot air from the top of the oven in a direction transverse to the direction of movement of the mat and the hot air is extracted through the bottom of the oven.

2. The method as claimed in claim 1, wherein the mat is irradiated with a sufficient power so that presence of water in the mat after at least partial drying by irradiation is less than a predetermined value.

3. The method as claimed in claim 1, wherein an irradiation power is selected such that temperature of the mat during the at least partial drying remains less than the curing temperature of the binder.

4. The method as claimed in claim 1, wherein an irradiation power is selected such that left/right difference in percentage of water by mass in the mat is reduced to less than 30% after irradiation.

5. The method as claimed in claim 1, wherein the irradiation is carried out over an entire width of the mat in movement.

6. The method as claimed in claim 1, wherein temperature of the hot air blown into at least one compartment of the oven is at least 100° C. higher than the curing temperature of the binder.

7. The method as claimed in claim 1, wherein the air is blown into the oven through the mat.

8. The method as claimed in claim 1, wherein density of the mat lies between 5 and 250 kg/m³.

9. A method for manufacturing a continuous mat of mineral or plant fibers comprising fibering with fibering equipment comprising a centrifuge or a set of centrifuges, or a rotor or a set of rotors, followed by a baking method as claimed in claim 1.

10. A method for baking a continuous mat of mineral or plant fibers, or of glass or rock type, successively comprising:
- application of an aqueous solution, containing a binder diluted in the solution, onto mineral or plant fibers, the application being made by spraying or atomization in fractions of binder solution;
- shaping of the fibers to form a continuous mat on a conveyor in motion;
- heating the mat in movement through an oven by a hot air flow at a temperature higher than a curing temperature of the binder;
- at least partial drying of the mat before entry into the oven, the at least partial drying including irradiation of the mat in movement with radiofrequency electromagnetic waves whose frequency lies between 3 MHz and 300 GHz,
- wherein during the at least partial drying of the mat before entry into any oven for heating, air at a temperature less than curing temperature of the binder is blown onto the mat in an irradiation zone to remove moisture,
- wherein the oven includes a plurality of compartments, and
- wherein one or more of the compartments introduces hot air from a bottom of the oven in a direction transverse to a direction of movement of the mat and the hot air is extracted though a top of the oven, and one or more of the compartments introduce hot air from the top of the oven in a direction transverse to the direction of movement of the mat and the hot air is extracted through the bottom of the oven.

* * * * *